(12) United States Patent
Legacy

(10) Patent No.: US 8,823,195 B2
(45) Date of Patent: Sep. 2, 2014

(54) HYDRO ELECTRIC ENERGY GENERATION AND STORAGE STRUCTURE

(71) Applicant: Mark Robert John Legacy, Dieppe (CA)

(72) Inventor: Mark Robert John Legacy, Dieppe (CA)

(*) Notice: Subject to any disclaimer, the term of this patent is extended or adjusted under 35 U.S.C. 154(b) by 0 days.

(21) Appl. No.: 13/855,865

(22) Filed: Apr. 3, 2013

(65) Prior Publication Data

US 2013/0257057 A1     Oct. 3, 2013

Related U.S. Application Data

(60) Provisional application No. 61/619,793, filed on Apr. 3, 2012.

(51) Int. Cl.
| | |
|---|---|
| *F01D 15/10* | (2006.01) |
| *F02C 6/00* | (2006.01) |
| *H02K 7/18* | (2006.01) |
| *H02P 9/04* | (2006.01) |
| *F03B 13/08* | (2006.01) |
| *F03B 13/06* | (2006.01) |
| *F03B 13/00* | (2006.01) |
| *F03B 13/10* | (2006.01) |

(52) U.S. Cl.
CPC ............... *F03B 13/08* (2013.01); *Y02E 10/22* (2013.01); *Y02E 60/17* (2013.01); *F03B 13/06* (2013.01)
USPC ............ 290/52; 290/43; 290/54; 60/325; 60/398

(58) Field of Classification Search
CPC ......... Y02E 10/22; Y02E 60/17; Y02E 10/20; E02B 9/06
USPC ............ 290/43, 52, 54; 60/325, 398
See application file for complete search history.

(56) References Cited

U.S. PATENT DOCUMENTS

| | | | |
|---|---|---|---|
| 1,231,051 A | 6/1917 | Nordberg | 60/410 |
| 1,247,520 A | 11/1917 | Fessenden | 60/398 |
| 1,297,363 A | 3/1919 | Kneedler | 60/513 |
| 1,396,994 A | 11/1921 | Cate | 415/7 |
| 2,015,332 A | 9/1935 | Baumann | 416/219 R |
| 2,054,142 A | 9/1936 | Sharp | 415/129 |
| 2,268,074 A | 12/1941 | Keller | 60/658 |
| 2,621,481 A | 12/1952 | Bowden | 60/657 |
| 2,646,812 A * | 7/1953 | Rheingans et al. | 415/17 |
| 2,724,082 A * | 11/1955 | Hornfeck | 318/482 |
| 2,897,375 A | 7/1959 | Fevre | 405/78 |
| 3,028,727 A * | 4/1962 | Anston | 60/473 |

(Continued)

FOREIGN PATENT DOCUMENTS

AU     2008249138     6/2009

*Primary Examiner* — Pedro J Cuevas
(74) *Attorney, Agent, or Firm* — Dean Palmer IP Law/IProperty Inc.

(57) ABSTRACT

A hydro electric energy generation structure is disclosed. The structure comprises: a gravity wall forming a closed outer perimeter extending above an upper water level of an existing hydraulic reservoir, and extending below the reservoir floor; at least one water inlet hydraulically connecting a first penstock to a first turbine generator below the water inlet. The structure further comprises: at least one lower water storage reservoir within the perimeter of the gravity wall receiving water from the first turbine generator; at least one pump receiving water from the lower water storage reservoir and pumping it through a pump delivery conduit to at least one upper water storage reservoir above the gravity wall; at least one second penstock delivering water from the upper water storage reservoir to a second turbine generator below; and a tailrace for returning the water into the existing reservoir.

19 Claims, 7 Drawing Sheets

(56) References Cited

U.S. PATENT DOCUMENTS

| | | | |
|---|---|---|---|
| 3,405,278 A | 10/1968 | Ley | 290/52 |
| 3,614,268 A | 10/1971 | Merenda | 417/237 |
| 3,677,008 A | 7/1972 | Koutz | 60/650 |
| 3,754,147 A * | 8/1973 | Hancock et al. | 290/53 |
| 3,785,747 A | 1/1974 | Mayo, Jr. | 415/33 |
| 3,803,422 A * | 4/1974 | Krickler | 290/52 |
| 3,891,860 A | 6/1975 | Hutarew | 290/52 |
| 3,935,488 A | 1/1976 | Spirk et al. | 310/53 |
| 3,939,356 A | 2/1976 | Loane | 290/52 |
| 3,991,563 A | 11/1976 | Pelin | 60/235 |
| 3,996,741 A * | 12/1976 | Herberg | 60/398 |
| 4,010,614 A * | 3/1977 | Arthur | 60/641.15 |
| 4,012,920 A | 3/1977 | Kirschbaum | 62/235.1 |
| 4,055,948 A | 11/1977 | Kraus et al. | 60/641.8 |
| 4,058,979 A | 11/1977 | Germain | 60/327 |
| 4,064,403 A | 12/1977 | Miller | 290/52 |
| 4,075,838 A * | 2/1978 | Pelin | 60/325 |
| 4,109,160 A | 8/1978 | Goto et al. | 290/52 |
| 4,132,901 A | 1/1979 | Crausbay | 290/53 |
| 4,166,222 A | 8/1979 | Hanley | 290/55 |
| 4,175,510 A | 11/1979 | Devine | 114/227 |
| 4,180,976 A * | 1/1980 | Bunn | 60/325 |
| 4,182,123 A | 1/1980 | Ueda | 60/325 |
| 4,182,128 A | 1/1980 | Gardner | 60/652 |
| 4,206,608 A | 6/1980 | Bell | 60/698 |
| 4,236,083 A | 11/1980 | Kenney | 290/55 |
| 4,237,688 A | 12/1980 | Demmers | 60/484 |
| 4,241,283 A * | 12/1980 | Storer, Sr. | 290/54 |
| 4,258,269 A * | 3/1981 | Tsubota | 290/53 |
| 4,265,599 A | 5/1981 | Morton | 417/54 |
| 4,275,989 A | 6/1981 | Gutierrez Atencio | 415/129 |
| 4,278,895 A | 7/1981 | Cros | 290/52 |
| 4,282,444 A * | 8/1981 | Ramer | 290/52 |
| 4,284,900 A | 8/1981 | Botts | 290/43 |
| 4,307,299 A * | 12/1981 | Norton | 290/52 |
| 4,310,769 A | 1/1982 | Mazzone et al. | 290/54 |
| 4,321,475 A | 3/1982 | Grub | 290/52 |
| 4,335,319 A | 6/1982 | Mettersheimer, Jr. | 290/54 |
| 4,380,419 A * | 4/1983 | Morton | 417/334 |
| 4,391,097 A | 7/1983 | Tsunoda et al. | 60/398 |
| 4,398,095 A | 8/1983 | Ono | 290/53 |
| 4,408,452 A | 10/1983 | Tsunoda | 60/398 |
| 4,426,846 A | 1/1984 | Bailey | 60/398 |
| 4,433,248 A | 2/1984 | Marks | 290/44 |
| 4,441,029 A | 4/1984 | Kao | 290/52 |
| 4,443,707 A | 4/1984 | Scieri et al. | 290/4 R |
| 4,468,153 A | 8/1984 | Gutierrez Atencio | 405/78 |
| 4,475,334 A * | 10/1984 | Kuwabara | 60/398 |
| 4,514,977 A | 5/1985 | Bowen | 60/398 |
| 4,629,904 A | 12/1986 | Rojo, Jr. et al. | 290/52 |
| 4,667,115 A | 5/1987 | Cadwell | 290/54 |
| 4,686,009 A | 8/1987 | McCabe | 202/176 |
| 4,691,115 A * | 9/1987 | Robinson | 290/1 R |
| 4,698,516 A * | 10/1987 | Thompson | 290/54 |
| 4,703,626 A | 11/1987 | Jensen | 60/641.7 |
| 4,739,182 A * | 4/1988 | Kenderi | 290/54 |
| 4,741,389 A | 5/1988 | Smith | 165/45 |
| 4,755,690 A | 7/1988 | Obermeyer | 290/52 |
| 4,764,087 A | 8/1988 | Pham-Phu | 415/142 |
| 4,807,437 A * | 2/1989 | Pelin | 60/325 |
| 4,843,249 A | 6/1989 | Bussiere | 290/53 |
| 4,873,828 A | 10/1989 | Laing et al. | 60/659 |
| 4,941,771 A | 7/1990 | Perper | 405/78 |
| 4,965,998 A | 10/1990 | Estigoy et al. | 60/325 |
| 4,977,744 A | 12/1990 | Lenz | 60/641.15 |
| 5,027,000 A | 6/1991 | Chino et al. | 290/53 |
| 5,132,550 A | 7/1992 | McCabe | 290/53 |
| 5,136,173 A | 8/1992 | Rynne | 290/53 |
| 5,384,489 A | 1/1995 | Bellac | 290/44 |
| 5,421,962 A | 6/1995 | Shvarts et al. | 202/234 |
| 5,440,176 A | 8/1995 | Haining | 290/54 |
| 5,685,151 A | 11/1997 | Ross | 60/641.8 |
| 5,742,515 A | 4/1998 | Runkle et al. | 700/287 |
| 5,765,499 A | 6/1998 | McKenzie | 114/347 |
| 5,872,406 A | 2/1999 | Ullman et al. | 290/53 |
| 5,905,312 A * | 5/1999 | Liou | 290/54 |
| 5,921,745 A | 7/1999 | Round et al. | 415/4.2 |
| 5,929,531 A | 7/1999 | Lagno | 290/53 |
| 6,023,105 A | 2/2000 | Youssef | 290/54 |
| 6,051,892 A | 4/2000 | Toal, Sr. | 290/43 |
| 6,097,104 A | 8/2000 | Russell | 290/54 |
| 6,099,255 A | 8/2000 | Lee | 416/169 R |
| 6,100,600 A | 8/2000 | Pflanz | 290/54 |
| 6,160,336 A | 12/2000 | Baker, Jr. et al. | 310/74 |
| 6,193,479 B1 | 2/2001 | Angoli | 417/423.5 |
| 6,347,515 B1 | 2/2002 | Kadoche | 60/372 |
| 6,359,347 B1 | 3/2002 | Wolf | 290/54 |
| 6,388,342 B1 | 5/2002 | Vetterick, Sr. et al. | 290/53 |
| 6,420,794 B1 | 7/2002 | Cao | 290/43 |
| 6,546,726 B1 | 4/2003 | Tomoiu | 60/495 |
| 6,559,553 B2 | 5/2003 | Yumita et al. | 290/54 |
| 6,668,555 B1 | 12/2003 | Moriarty | 60/641.8 |
| 6,672,054 B2 | 1/2004 | Merswolke et al. | 60/398 |
| 6,718,761 B2 | 4/2004 | Merswolke et al. | 60/398 |
| 6,729,857 B2 | 5/2004 | Zabtcioglu | 417/330 |
| 6,748,737 B2 | 6/2004 | Lafferty | 60/398 |
| 6,791,206 B1 | 9/2004 | Woodbridge | 290/53 |
| 6,817,180 B2 | 11/2004 | Newman | 60/639 |
| 6,860,068 B2 | 3/2005 | Halloran | 52/1 |
| 6,861,766 B2 | 3/2005 | Rembert | 290/43 |
| 6,885,114 B2 | 4/2005 | Baarman et al. | 290/43 |
| 6,967,413 B2 | 11/2005 | Atiya | 290/43 |
| 6,990,809 B2 | 1/2006 | Abouraphael | 60/496 |
| 7,003,955 B2 | 2/2006 | Davis | 60/641.11 |
| 7,171,812 B2 | 2/2007 | Schubert | 60/641.15 |
| 7,178,337 B2 | 2/2007 | Pflanz | 60/641.2 |
| 7,233,078 B2 | 6/2007 | Baarman et al. | 290/43 |
| 7,239,035 B2 | 7/2007 | Garces et al. | 290/43 |
| 7,262,517 B1 | 8/2007 | Srybnik et al. | 290/54 |
| 7,281,371 B1 | 10/2007 | Heidenreich | 60/398 |
| 7,339,285 B2 | 3/2008 | Negron Crespo | 290/53 |
| 7,388,302 B1 | 6/2008 | Srybnik et al. | 290/54 |
| 7,478,974 B1 | 1/2009 | Kelly | 405/78 |
| 7,525,212 B1 | 4/2009 | Catlin | 290/53 |
| 7,615,882 B2 | 11/2009 | Riley | 290/54 |
| 7,656,050 B2 | 2/2010 | Riley | 290/43 |
| 7,663,258 B2 | 2/2010 | Baarman et al. | 290/43 |
| 7,675,188 B2 | 3/2010 | Baarman et al. | 290/54 |
| 7,701,076 B2 | 4/2010 | Baarman et al. | 290/54 |
| 7,759,812 B2 | 7/2010 | Taylor et al. | 290/44 |
| 7,768,147 B2 | 8/2010 | Baarman et al. | 290/54 |
| 7,770,331 B2 | 8/2010 | Halloran | 52/1 |
| 7,795,748 B2 | 9/2010 | Deangeles | 290/43 |
| 7,837,411 B2 | 11/2010 | Krouse | 405/78 |
| 7,854,119 B2 | 12/2010 | Strain | 60/641.11 |
| 7,928,595 B1 | 4/2011 | Gonzalez-Carlo | 290/54 |
| 7,944,072 B2 | 5/2011 | McKie | 290/52 |
| 7,952,219 B2 | 5/2011 | Riley | 290/54 |
| 7,959,411 B2 | 6/2011 | Schlabach et al. | 416/227 A |
| 7,972,108 B2 | 7/2011 | Fonkenell | 415/126 |
| 8,030,790 B2 * | 10/2011 | Kamenov | 290/43 |
| 8,058,741 B1 | 11/2011 | Echemendia | 290/53 |
| 8,072,089 B2 * | 12/2011 | Krouse et al. | 290/54 |
| 8,082,067 B2 * | 12/2011 | Nicoson | 700/290 |
| 8,166,760 B2 | 5/2012 | Fiske | 60/639 |
| 8,177,477 B2 | 5/2012 | Lyatkher | 415/3.1 |
| 8,234,861 B2 * | 8/2012 | Frye | 60/398 |
| 8,492,918 B1 * | 7/2013 | Kamenov | 290/43 |
| 8,643,206 B2 * | 2/2014 | Ekern | 290/53 |
| 2008/0179888 A1 | 7/2008 | Krouse | 290/54 |
| 2009/0085356 A1 | 4/2009 | Lyatkher | 290/52 |
| 2009/0134623 A1 * | 5/2009 | Krouse | 290/43 |
| 2009/0140525 A1 | 6/2009 | Deangeles | 290/54 |
| 2009/0193808 A1 | 8/2009 | Fiske | 60/721 |
| 2010/0170236 A1 * | 7/2010 | Lezi | 60/398 |
| 2010/0209192 A1 * | 8/2010 | Behm et al. | 405/87 |
| 2010/0253080 A1 * | 10/2010 | DeAngeles | 290/52 |
| 2012/0274070 A1 * | 11/2012 | Payre et al. | 290/52 |
| 2012/0292907 A1 * | 11/2012 | Krouse | 290/52 |
| 2013/0205767 A1 * | 8/2013 | Shinde | 60/495 |
| 2014/0018963 A1 * | 1/2014 | Behm et al. | 700/281 |

* cited by examiner

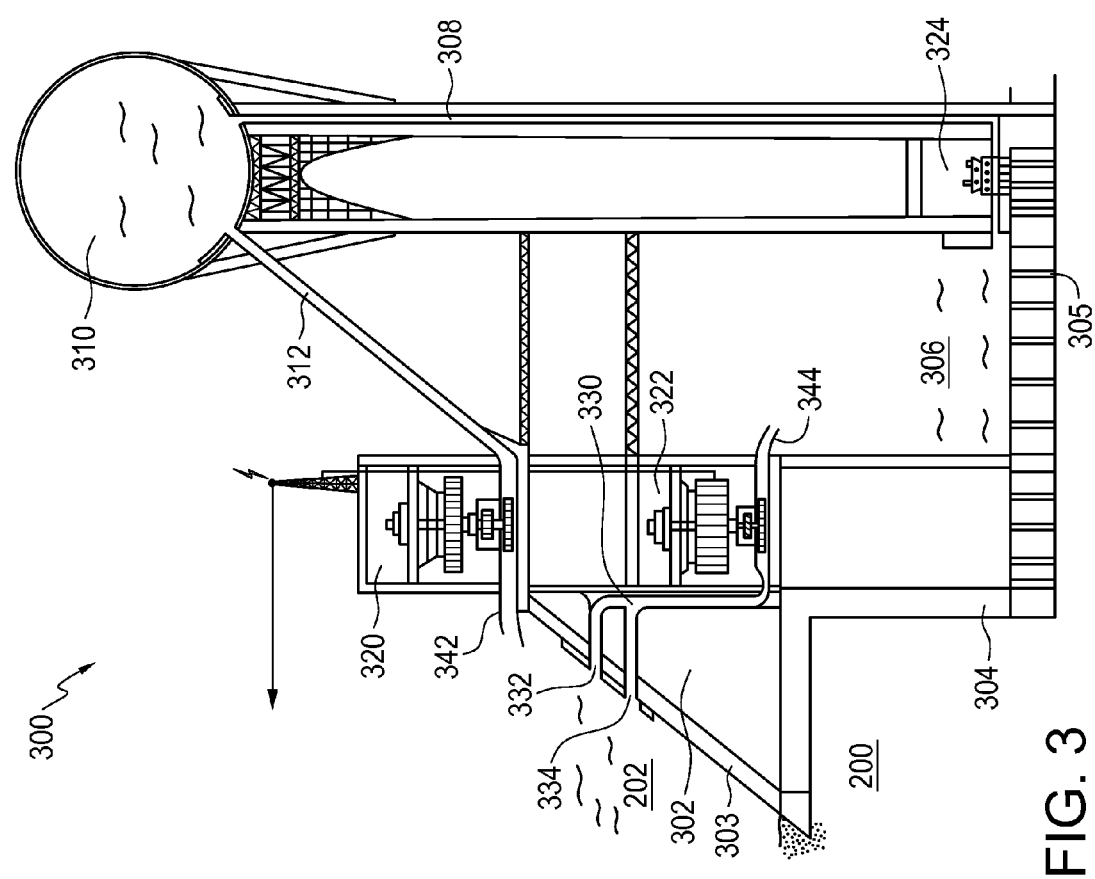

HYDRO ELECTRIC ENERGY GENERATION AND STORAGE STRUCTURE

1. TECHNICAL FIELD

The present invention relates generally to structures for generating and storing electrical energy. More particularly, the present invention relates to a structure for generating and/or storing hydro electric energy or power using an existing hydraulic reservoir.

2. BACKGROUND OF THE INVENTION

In the pursuit of economic and environmentally responsible or "green" electrical power generation, a variety of technology and associated systems utilizing moving water as a source of energy for generating electrical power have been developed and are typically referred to as hydro electric power generation technologies and systems according to the art. In early examples of hydro electric power utilization, water wheels were used to capture the movement of running water in rivers or streams and to power rotating electrical generators to generate electrical power.

In more recent applications known in the art, hydro electric power generation systems have implemented man-made dam structures in order to impound a man-made reservoir of water, which is then gradually released to power hydro turbine generators to generate electrical power. However, such known hydro electric dam applications typically require the flooding of large areas of land in order to create a sufficiently large reservoir behind a dam in order to be effective for generating electrical power, and such man-made reservoirs may have significant negative impacts on environmental characteristics of the surrounding area due to the required flooding of the reservoir, as well as the hydrological changes imposed on the areas upstream and downstream of the hydroelectric dam such as water flow changes due to the restricted and variable water flow released from the dam during power generation.

Hydro electric generation systems utilizing dams and man-made reservoirs created by flooding of land areas have also been adapted to provide for storage of power generating capacity in the form of water pumped from a lower reservoir to an upper man-made reservoir which may then later be released to power a turbine generator to generate electrical power. Such water energy storage systems are also known as pumped storage hydro electric systems according to the art. However, such pumped storage systems typically also require the construction of a dam and flooding of a land area to create one or more man-made reservoirs, which may have a significant negative environmental impact on the affected area.

Additionally, the adoption and integration of a wide range of different types of electrical power generation systems into the modern electrical supply grid of most industrially developed regions has led to significant issues relating to optimizing the mix of electrical power generation systems available, and accounting for the particular operation, adjustability and availability variables associated with electrical power generation systems in relation to the varying electrical power demands of electrical grid users. Such grid optimization has been further complicated with the increasing adoption of new and "green" electrical power generation systems such as solar, wind and tidal power generation systems, which may typically provide intermittent and varying power production depending on natural fluctuations of renewable energy sources.

Accordingly, there is a need for a hydro electric energy generation structure, such as may be suitable for use in conjunction with other energy generation systems, that addresses some of the limitations of existing hydro electric energy generation designs according to the art.

3. SUMMARY OF THE INVENTION

It is an object of the present invention to provide a hydro electric energy generation structure that addresses some of the limitations of the prior art.

According to an embodiment of the present invention, a hydro electric energy generation structure is provided where the structure comprises: a gravity wall forming an outer perimeter of said structure, wherein said gravity wall comprises a first outer and upper section inclined towards the center of said structure and adapted to bear on a floor of a hydraulic reservoir and extend above an upper water level of said hydraulic reservoir, and a second recessed inner and lower section adapted for installation extending below the floor of said hydraulic reservoir; and at least one water inlet situated in said first section of said gravity wall hydraulically connected to a first penstock for delivering water from said reservoir to a first turbine generator situated below said water inlet and thereafter to a first tailrace. The structure further comprises: at least one lower water storage reservoir situated below and hydraulically connected to said first tailrace and within said perimeter of said gravity wall for receiving water from said first turbine generator; at least one pump hydraulically connected to said lower water storage reservoir for receiving water from said lower water storage reservoir; at least one pump delivery conduit hydraulically connected to said pump; at least one upper water storage reservoir situated and supported above said gravity wall and hydraulically connected to said pump delivery conduit for receiving water from said pump; at least one second penstock hydraulically connected to said upper water storage reservoir for delivering water from said upper water storage reservoir to a second turbine generator situated below said upper water storage reservoir and above said water inlet; and a second tailrace for receiving water from said second turbine generator and delivering said water into said existing reservoir.

According to another embodiment of the present invention, a hydro electric energy generation structure as described is provided, wherein the structure additionally comprises a support structure. In such an embodiment, the support structure is structurally secured to the gravity wall and adapted to support the at least one upper water storage reservoir.

According to a further embodiment of the present invention, a method of generating electrical power using the hydro electric energy generation structure described above is provided. In such an embodiment, the method of generating electrical power comprises: generating electrical power by admitting water into said at least one water inlet to power said at least one first turbine generator during a first period of relatively high power demand from an electrical supply grid electrically connected to said at least one first turbine generator; operating said at least one water pump to pump water from said at least one lower water storage reservoir to said at least one upper water storage reservoir during a second period of relatively lower power demand from an electrical supply grid electrically connected to supply power to said at least one water pump; and generating electrical power by admitting water from said at least one upper water storage reservoir to power said at least one second turbine generator during a third period of relatively high power demand from an electrical supply grid electrically connected to said at least one second turbine generator.

Further advantages of the invention will become apparent when considering the drawings in conjunction with the detailed description.

4. BRIEF DESCRIPTION OF THE DRAWINGS

The hydro electric energy generation structure of the present invention will now be described with reference to the accompanying drawing figures, in which:

FIG. 3 illustrates a partial cross-sectional view of a portion of an exemplary hydro electric energy generation structure according to another embodiment of the invention.

Similar reference numerals refer to corresponding parts throughout the several views of the drawings.

5. DETAILED DESCRIPTION OF THE INVENTION

Exemplary embodiments of the present invention are described below with reference to the Figures of the drawings. It is intended that the embodiments and Figures disclosed herein are to be considered illustrative rather than restrictive.

Figure 1:
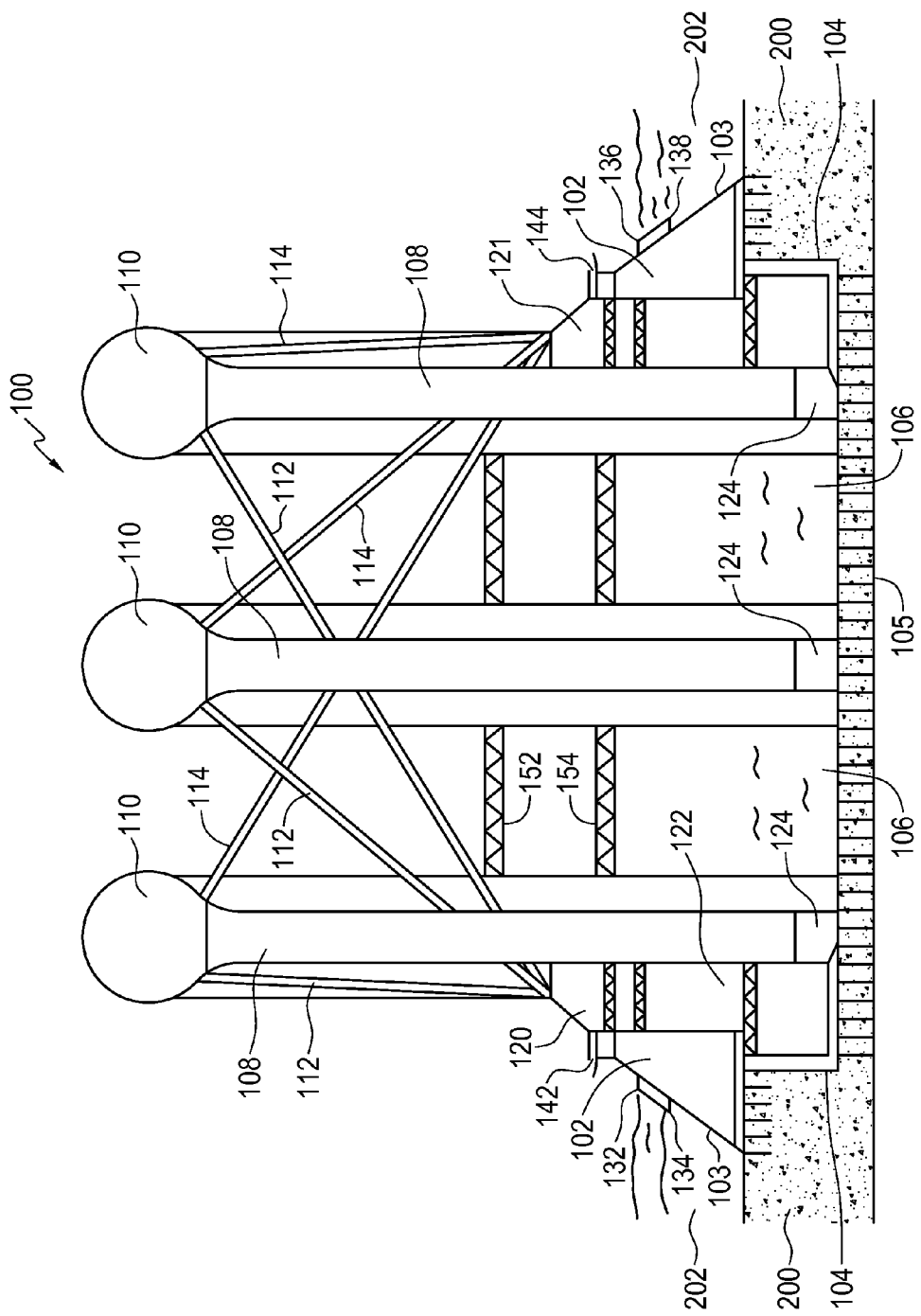
FIG. 1 illustrates a cross-sectional elevation view of an exemplary hydro electric energy generation structure according to an embodiment of the present invention.
Figure 1A:
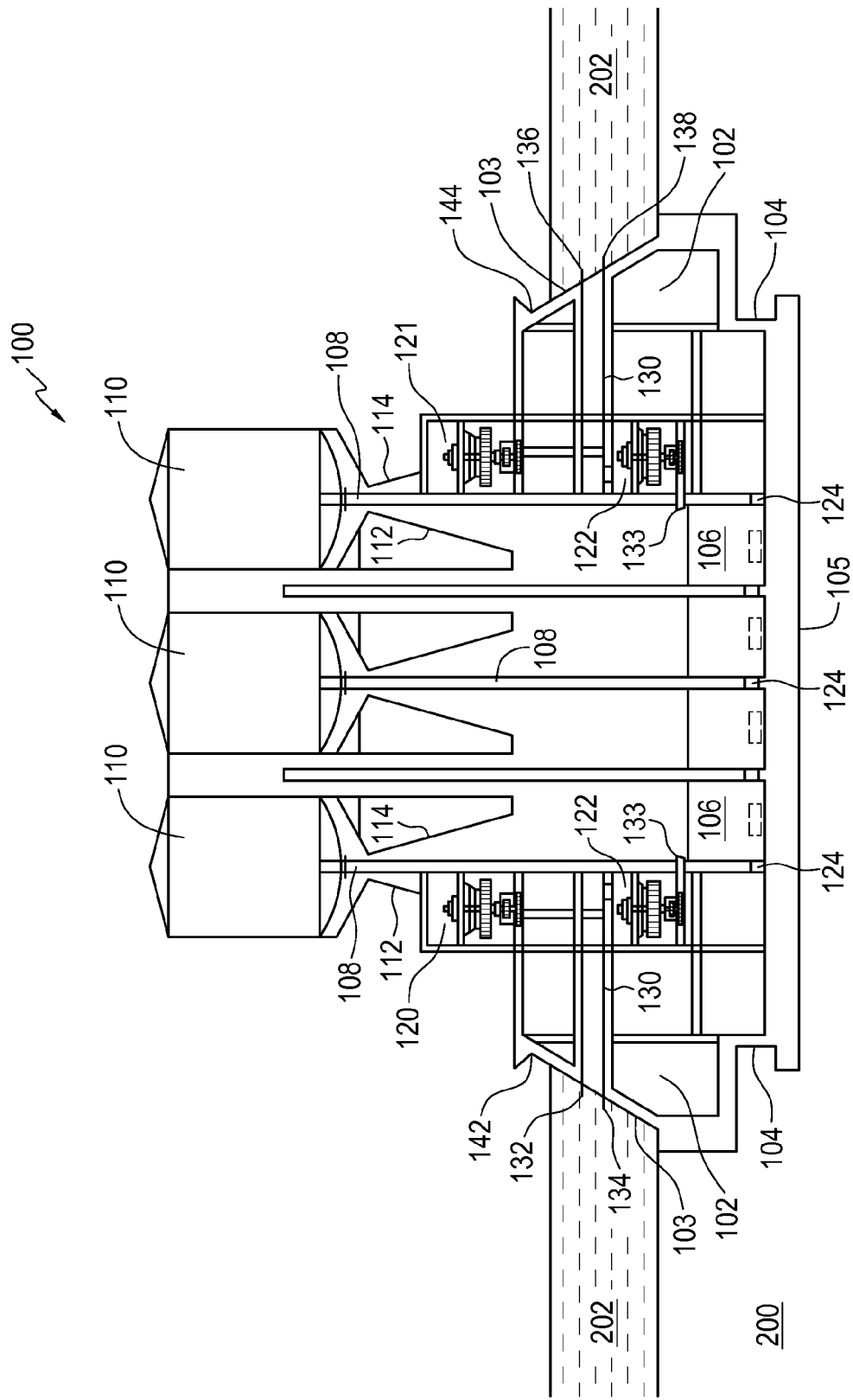
FIG. 1A illustrates an alternate cross-sectional elevation view of an exemplary hydro electric energy generation structure oriented in the same direction as FIG. 1, according to an embodiment of the present invention.

Referring now to FIGS. 1 and 1A, FIG. 1 illustrates an elevation view of an exemplary hydro electric energy generation structure 100 according to an embodiment of the present invention, and FIG. 1A illustrates an alternate cross-sectional elevation view of an exemplary hydro electric energy generation structure 100 oriented in the same direction as FIG. 1, according to an embodiment of the present invention. The exemplary hydro electric energy generation structure 100 illustrated in FIG. 1 is particularly adapted for location and installation at a site within, or adjacent to and at least partially within an existing hydraulic reservoir 202, such as an ocean (typically in a near shore marine location), a lake, an inland sea, an artificial lake, or even a large river, delta or estuary site, for example. In one embodiment of the present invention, the hydro electric energy generation structure 100 typically comprises a gravity wall 102 forming an outer perimeter of said structure 100, wherein said gravity wall 102 comprises an first outer and upper wall section 103 inclined towards the center of said structure 100 and adapted to bear on a floor 200 of said hydraulic reservoir 202 and extend above an upper water level of said hydraulic reservoir 202, and a second recessed inner and lower wall section 104 located below the first section 103, and adapted for installation extending below the floor 200 of said hydraulic reservoir 200. In a particular embodiment, the outer perimeter of the structure 100 formed by the gravity wall 102 is substantially closed, such as to allow for containment of water within the gravity wall perimeter 102. In one embodiment, the hydro electric energy generation structure 100 may desirably be substantially rectangular in shape, with the perimeter gravity structure walls 102 meeting at substantially right angles at its corners. However, it may be appreciated that in other embodiments, the hydro electric energy generation structure 100 may take the shape of other preferably symmetrical closed polygons, such as hexagonal, octagonal or circular shapes for example, wherein the perimeter gravity wall 102 takes the shape of such alternative shapes. In a particular embodiment, the angle of inclination of the first outer and upper wall section 103 towards the center of the structure 100 may be selected from any desired angle which is suited for purposes of structural and hydrological stability, such as to provide a suitably wide and stable base for the structure 100, and to provide a suitable angle to withstand expected wave, wind or other conditions related to the characteristics of the existing reservoir 202, such as tides, waves, winds, aquatic life, shipping, debris, or other characteristics of marine or non-marine reservoirs 202, for example. In a specific embodiment, the first outer and upper wall section 103 may be optimally inclined towards the center of the structure 100 at an angle of approximately 72 degrees from horizontal, for example. In a further embodiment, the second inner and lower wall section 104 of the structure 100 may be substantially vertical in orientation, and may optionally comprise one or more non-vertical steps or recesses in the second lower wall section 104, such as are shown in FIG. 1A, for example. In a particular embodiment, the base 105 of the structure 100 may be installed at an elevation substantially below the bottom 200 of the reservoir 202 such as to bear on or be supported by or attached to an excavation into the reservoir bottom 200, so as to provide a base 105 located suitably far below the water surface of the reservoir 202 so as to provide for a suitably large hydraulic head for purposes of efficient hydro electric energy generation within the structure 100. In yet another particular embodiment, the gravity wall 102 may comprise at least one of a substantially solid reinforced concrete gravity wall 102 structure, and/or a substantially hollow reinforced concrete gravity wall 102 structure, wherein at least a portion of the interior of the substantially hollow gravity wall 102 comprises one or more open spaces within the gravity wall 102.

The exemplary hydro electric energy generation structure 100 also comprises at least one water inlet 134 located in the first inclined wall section 103 of the perimeter gravity wall 102. In one embodiment, multiple primary water inlets 134 may be located spaced along at least one side of the first wall section 103. In another embodiment, the water inlets may also include one or more primary inlets 138 spaced along another side of the first wall section 103. In yet another embodiment, for each primary water inlet 134 or 138, the first wall section 103 may also include a corresponding secondary water inlet 132 or 136, located directly above the each primary water inlet 134 or 138. In such an arrangement, each primary water inlet 134 or 138 may preferably be located slightly below the expected lowest water level of the reservoir 202, such as slightly below the low tide level in the case of a marine reservoir 202, or slightly below the expected seasonal low water level of a non-marine reservoir 202. In such an arrangement, the secondary corresponding water inlets 132 or 136, may preferably be located slightly below the expected highest water level of the reservoir 202, such as slightly below the high tide level in the case of a marine reservoir 202, or slightly below the expected seasonal high water level of a non-marine reservoir 202. Therefore, in such an arrangement, each pair of corresponding primary and secondary water inlets 134 and 132 may be advantageously located so as to allow the flow of water from the reservoir 202 into at least one of the primary and secondary water inlets 134 and 132 at any expected water level of the reservoir 202.

In one embodiment, each of the primary and/or secondary water inlets 134, 132 is hydraulically connected to a first penstock 130 for delivering water from the reservoir 202 to a first turbine generator 120 located below the water inlet 134 or 132 and thereafter to a first tailrace 133. Accordingly, in such an embodiment, water from reservoir 202 may be allowed to enter through at least one of the primary and/or secondary water inlets 134, 132, and travel through first penstock 130 to enter and power a first turbine generator 122 in order to generate electric power. Following the flow of the water through the first turbine generator 122, the water may then exit the turbine into the first tailrace 133. It may be appreciated that any suitable known type of turbine generator may be used to generate electric power from the flow of water from reservoir 202 through the first penstock 130, however, in a particular embodiment of the invention, the first turbine generator 122 may be of a Francis or Pelton type turbine generator 122, and may preferably be adapted for operation under ultra low to medium levels of hydraulic head.

In one embodiment of the invention, at least one lower water storage reservoir 106 is situated within the interior of the perimeter gravity wall 102, and located below the first tailrace 133 and may be hydraulically connected to the first tailrace 133 so that water exiting the first tailrace 133 from the first turbine generator 122 may be received within the at least one lower water storage reservoir 106. As may be seen such as in FIGS. 1 and 1A, the at least one lower water storage reservoir 106 may desirably be located at the lowest elevation of the hydro electric energy generation structure 100 such that the bottom of the lower water storage reservoir 106 may desirably coincide with the base 105 of the structure 100. In such an embodiment, the lower section 104 of the gravity wall 102 may desirably extend a distance below the bottom 200 of the existing reservoir, such that bottom of each lower water storage reservoir 106 of the structure may be desirably located as far below the water intakes 134 or 132 as is possible, so as to desirably maximize the hydraulic head available for powering each first turbine generator 122.

According to an embodiment of the invention, the hydro electric energy generation structure 100 also comprises at least one water pump 124 hydraulically connected to at least one lower water storage reservoir 106 such that the water pump 124 receives water from the lower water storage reservoir 106 and pumps the water up to at least one upper water storage reservoir 110 by means of a pump delivery conduit 108 which is hydraulically connected to the water pump 124 and extends between the pump 124 and the upper water storage reservoir 110. Each upper water storage reservoir 110 is preferably situated and supported above the level of the top of the gravity wall 102, so that the water held in each upper water storage reservoir 110 is located substantially above the level of the top of the perimeter gravity wall structure 102. In one embodiment, each upper water storage reservoir 110 may be located and supported at the top of a support column which bears on and extends from the base 105 of the hydro electric energy generation structure 100 to the bottom of the upper water storage reservoir 110. In another embodiment, the support structure for each upper reservoir 110 may comprise multiple support columns including one or more substantially vertical support columns extending from the base 105 of the structure 100, and/or one or more inclined bracing support columns which may be connected to at least one of the base 105 or the perimeter gravity wall 102 of the structure 100, or alternatively, to the support structure of an adjacent upper water storage reservoir 110. In a particular embodiment, each upper water storage reservoir 110 may comprise a substantially cylindrical outer reservoir wall, with a bottom of the reservoir which is substantially formed as an inverted conical frustum, and a top of the reservoir which is substantially formed as an upright conical frustum or a dome, as is commonly known in the art for constructing elevated water storage reservoirs such as drinking water reservoirs, for example. In another embodiment, each upper water storage reservoir 110 may comprise a substantially spherical outer reservoir wall, as may be also be commonly known in the art of elevated reservoir design, for example.

In one embodiment, the hydro electric energy generation structure 100 also comprises at least one second penstock 112 or 114, to hydraulically connect each upper water storage reservoir 110 to at least one second turbine generator 120 which is located below the level of the upper water storage reservoir 110. Accordingly, in such an embodiment, water from the upper water storage reservoir 110 may be allowed to travel through the at least one second penstock 112, 114 to enter and power the second turbine generator 120 in order to generate electric power. Following the flow of water through the second turbine generator 120, the water may then exit the turbine generator 120 into a second tailrace 142, which conducts the flow of water to exit back into the existing reservoir 202. In a particular embodiment, the second tailrace 142 may be situated above the upper water level of the existing reservoir 202, so that water exiting the second turbine generator 120 may be returned to the existing reservoir 202 by gravity flow.

Similar to as referred to above in reference to the first turbine generator 122, it may be appreciated that any suitable known type of turbine generator may be used to generate electric power from the flow of water from upper water storage reservoir 110 through one or more second penstocks 112, 114, however, in a particular embodiment of the invention, the second turbine generator 120 may also be of a Francis or Pelton type turbine generator 120, and may preferably be adapted for operation under ultra low to medium levels of hydraulic head. In one embodiment, one or more second turbine generators 120 may be located along one side of the hydro electric energy generation structure 100, and one or more other second turbine generators 121 may be located along another opposing side of the structure 100. In a particular such embodiment, second turbine generators 120 and 121 may be substantially identical, while in another alternative embodiment, second turbine generators 120 and 121 may differ in at least one functional aspect in order to allow for configurability or flexibility of power generation from water stored in upper water storage reservoirs 110, for example.

In a particular embodiment of the present invention, at least one of the first and second turbine generators 122, 120 may desirably be structurally attached to and/or supported by the gravity wall 102 of the hydro electric energy generation structure 100. In an alternative embodiment, at least one of the first and second turbine generators 122, 120, may alternatively be structurally attached to and/or supported by an auxiliary structure such as an exemplary structural truss 154, which may itself be directly and/or indirectly supported by the gravity wall 102 of structure 100. In one such embodiment, one or more auxiliary support structures, such as structural truss 154 may desirably be adapted to provide cyclically loadable support to the elevated reservoir components, such as to provide shock absorption and/or damping during cyclical loading, such as during an earthquake, windstorm, or other cyclical loading condition or event, for example.

According to one embodiment of the present invention, the hydro electric energy generation structure 100 such as described above may be adapted for operation to generate hydro electric power by means of first and second turbine generators 122 and 120, and may therefore be desirably connected to an electrical grid or other supply system to provide such generated power to satisfy a power demand or load. In another embodiment, as described above, first and second turbine generators 122, 120 may comprise ultra low to medium head turbines, which may desirably provide rapidly adjustable power generation capacity, so as to allow for rapid adjustment of the power generated by the structure 100, as may be desirable for providing rapid and accurate load following or load matching hydro power generation capacity to an electrical grid or other electrical supply system, as may be used for peak matching or complementary power generation in combination with other less configurable or adjustable power generation sources, for example. According to a further embodiment, the hydro electric energy generation structure 100 may also be adapted for operation to receive electrical power from one or more sources such as other base load or conventional power generation sources, and to use such received power to operate water pumps 124 to store water in upper water storage reservoirs 110 for later hydro electric power generation through second power turbines 120, thereby providing for electrical power storage capacity. In yet a further embodiment, at least a portion of the power generated by first and/or second turbine generators 122, 120 may be used to power water pumps 124, with or without use of externally generated electrical power received by the structure 100, for the purpose of storing water in upper water storage reservoirs 110, for future power generation.

In a particular embodiment of the present invention, each of first penstocks 130, second penstocks 112, 114 and pump delivery conduits 108 may comprise conventional substantially cylindrical or other suitably shaped water conduits, such as water pipes, or alternatively cylindrical or other suitably shaped pipe-like water flow passageways extending through solid portions of hydro electric energy generation structure 100, such as extending through the gravity wall structure 102 from the water inlets 134, 132, to the first turbine generator 122, for example. In one such embodiment, water flow through the first penstocks 130 may be controlled such as by the use of one or more controllable valves in the water inlets 134, 132, or in the first penstock 130 itself, so as to control the volume rate of water flowing from the water inlets 134, 132 through the first turbine generator 122 and into lower water storage reservoirs 106 through first tailrace 133, for example. In such a manner, the power generation output of the first turbine generator 122 and also the volume rate of water entering the hydro electric energy generation structure 100 may desirably be controlled, for example.

In another embodiment, water flow through water pumps 124 and pump delivery conduits 108 to upper water storage reservoirs 110 may be desirably controlled such as by the use of controllable and variable output water pumps 124, so as to control the volume rate of water flow from the lower water storage reservoir 106 to each upper water storage reservoir 110, for example. In one embodiment, water pumps 124 may comprise variable flow electrical water pumps 124, which are powered and controlled electrically to determine the volume rate of water flow between lower and upper water storage reservoirs 106 and 110.

Similarly, in further embodiment, water flow through the second penstocks 112, 114 may be controlled such as by the use of one or more controllable valves in the second penstocks 112, 114, or at an entrance to the top of second penstocks 112, 114 in the upper water storage reservoir 110, so as to control the volume rate of water flowing from the upper water storage reservoirs 110 through the second turbine generator 120 and into the existing reservoir 202 through the second tailrace 142, for example. In such a manner, the power generation output of the second turbine generator 120 and also the volume rate of water leaving the hydro electric energy generation structure 100 may be controlled, for example.

In a particular embodiment, each upper water storage reservoir 110 may be hydraulically connected to at least two second penstocks 112, 114, each connected to a second turbine generator 120 located on different sides of the hydro electric energy generation structure 100, such that water from a single upper water storage reservoir 110 may be controllably released to flow through multiple second penstocks 112, and 114, and thereby power two or more second turbine generators 120 located on different locations on the hydro electric energy generation structure, for example.

In one embodiment according to the invention, the hydro electric energy generation structure 100 may be build from conventionally known materials and using conventionally known construction techniques suited for construction of large gravity wall type structures such as hydroelectric dams and associated powerhouses, for example. In one such embodiment, the hydro electric energy generation structure may be constructed from suitable known materials such as reinforced concrete, and may comprise additional structural support and frame components which may comprise steel beams, trusses, or towers such as exemplary structural support trusses 152 and 154 as shown in FIG. 1, which are shown as structural elements providing support to the vertical water pump delivery conduits 108 and upper water storage reservoirs 110, for example. In a particular such embodiment, structural trusses such as trusses 152 and/or 154 may desirably be adapted to provide cyclically loadable structural support, such as to provide shock adsorption and/or damping during cyclical loading, such as during an earthquake, windstorm, or other cyclical loading condition or event, for example.

In another optional embodiment, the hydro electric energy generation structure 100 may additionally comprise one or more enclosed structures attached to or supported by the remaining primary elements of the hydro electric energy generation structure 100 as recited above, wherein such enclosed structures may provide one or more of: storage space for auxiliary supplies or equipment, habitable space for operation and control of the structure 100, or habitable space for alternative non-energy generation-related purposes such as housing, or commercial activities ancillary to the structure 100, as may provide additional utility of the structure 100 in cases when the structure 100 is constructed in a near shore location proximate to a settlement such as a city, town or worksite, for example. In such cases where the structure 100 is located in a near shore location proximate to a settlement, a connecting bridge or other access may also be provided to connect and provide access for one or more of people, vehicles, supplies or energy between the shore and the structure 100. In a particular embodiment, a residential, commercial or mixed residential and commercial habitable development space and structures enclosing such space may be attached to or supported by the primary structural elements of the hydro electric energy generation structure 100, as recited above. In one such embodiment, a residential space, such as a multi-unit residential structure may be built atop the primary hydro electric energy generation structure 100, such that the residential structure substantially surrounds the upper portion of the hydro electric energy generation structure 100, for example.

In a particular embodiment of the present invention adapted for installation in ecologically sensitive existing reservoirs 202, the outer surface of the gravity wall 102 may comprise one or more coatings or layers attached to the outer structural portions of the gravity wall 102 which are submerged in the reservoir 202, such as to provide an outer gravity wall surface having reduced negative impact on aquatic life, or to facilitate integration of the gravity wall 102 into the aquatic ecosystem. In particular, one such embodiment may comprise an outer coating or layer comprising biocompatible materials and/or surface textures or recesses that are conducive to growth and integration of aquatic life with the gravity wall 102 following construction, for example.

According to one embodiment, the hydro electric energy generation structure 100 may be adapted for scalable and/or modular construction, and may be constructed at any suitable scale in order to provide desired capacities for power generation and storage (in the form of water in the upper water storage reservoirs 110). According to optional embodiments of the invention, the hydro electric energy generation structure 100 may be constructed according to any desirable size, allowing for desired capacity and efficiency of power generation and storage, and may be constructed with varying numbers of primary elements such as one or more water inlets 134, 132 and first penstocks 130, corresponding first turbine generators 120, and lower water storage reservoirs 106, as may be suitable for modular construction of structures 100 having varying sizes and capacities constructed from similar modularized component elements, for example. Similarly, the number of upper water storage reservoirs 110 may be selected based on desired capacity and/or structural parameters or constraints, and may comprise one or more upper water storage reservoirs 110, corresponding pumps 124 and pump delivery conduits 108, and second penstocks 112, 114, and corresponding second turbine generators 120, for example. In one particular embodiment, the hydro electric energy generation structure 100 may comprise between 2 to 8 lower water storage reservoirs 106, and corresponding pairs of water inlets 134, 132, first penstocks 130 and first turbine generators 122. The structure 100 may also comprise between 3 to 15 upper water storage reservoirs 110 and corresponding pump delivery conduits 108, between 2 to 14 second turbine generators 120 and between 4 to 30 corresponding second penstocks 112, 114. In another particular embodiment, the hydro electric energy generation structure 100 may desirably be constructed at a water depth of approximately 5 to 50 meters in existing reservoir 202. In yet another particular embodiment, base 105 of structure 100 may be constructed at a level between approximately 5 to 30 meters below the bottom 200 of existing reservoir 202, for example. According to yet another embodiment, the hydro electric energy generation structure 100 may be constructed from suitable materials such as resistant reinforced concrete and steel, for example, such that the structure 100 is designed for a very long useful life. In one such embodiment, the structure 100 may preferably be designed according to suitable known standards and using materials so as to provide for a minimum useful design life of at least 100 years, for example.

According to a particular modular embodiment of the present invention, the hydro electric energy generation structure 100 may be constructed from several modular sections or segments which may be substantially similar to adjacent sections or segments, thereby potentially allowing of standard construction techniques and equipment to be used to build multiple such sections or segments, or even for pre-fabrication of certain such modular sections or segments. In one such modular embodiment, similar modular sections of the gravity wall 102 may be constructed using similar construction or pre-fabrication techniques, such as may other similar sections or segments, such as supports and structures for water storage reservoirs 106, 110, penstocks 130, 112, 114, tailraces 133, 142 and other water conduction elements, as well as multiple turbine generator 120, 122 components and supporting structures, for example. In such modular embodiments, similar construction and/or pre-fabrication of similar modular components of hydro electric energy generation structure 100 may be implemented to reduce the cost and increase efficiency of construction of the structure 100, and may also be implemented to simplify and economize construction of structures having varying sizes, scales and power generation capacities, as may be desirable for differing applications and sites, for example.

Figure 2:
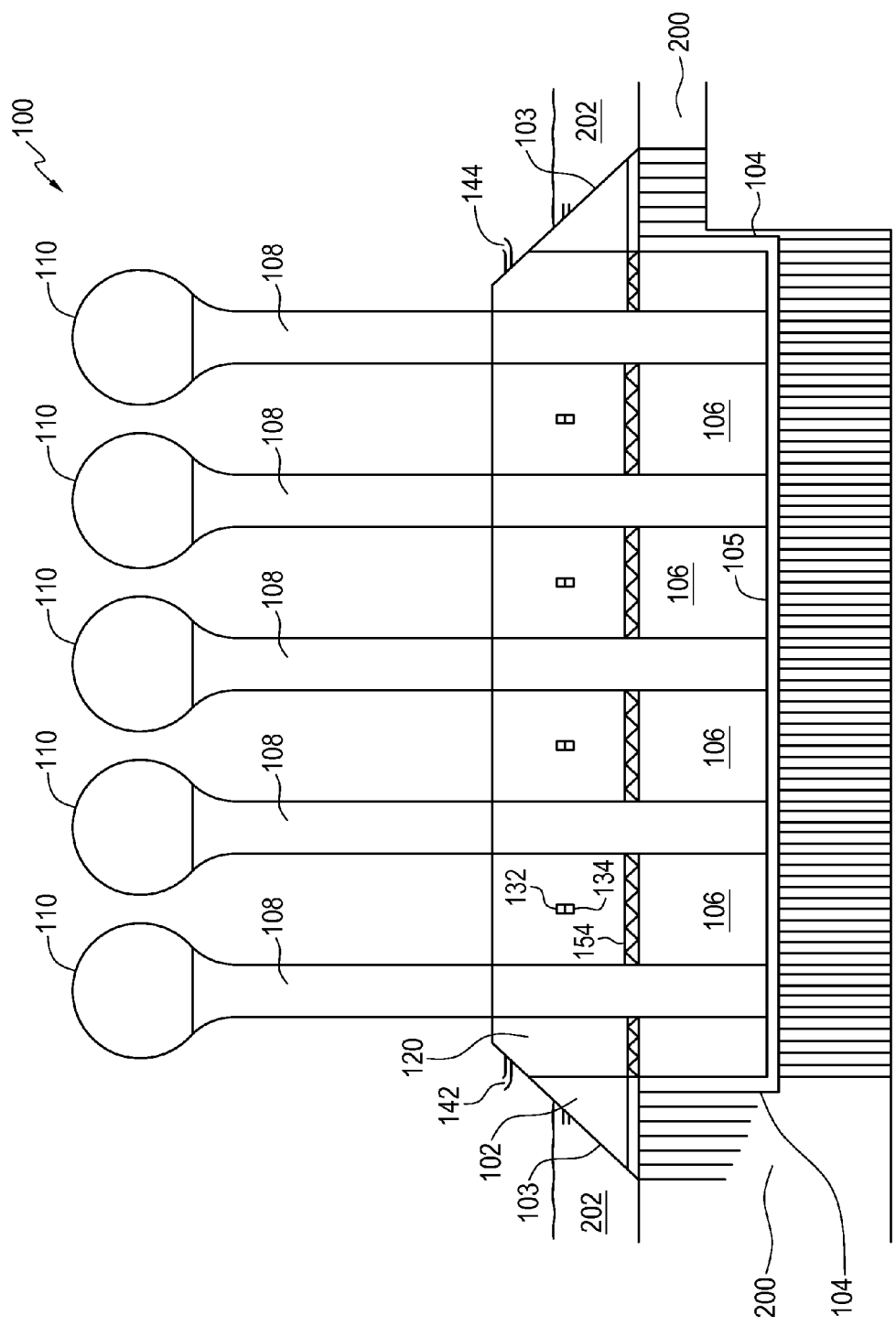
FIG. 2 illustrates a further cross-sectional elevation view of an exemplary hydro electric energy generation structure according to an embodiment of the invention, oriented perpendicular to the view illustrated in FIG. 1A.
Figure 2A:
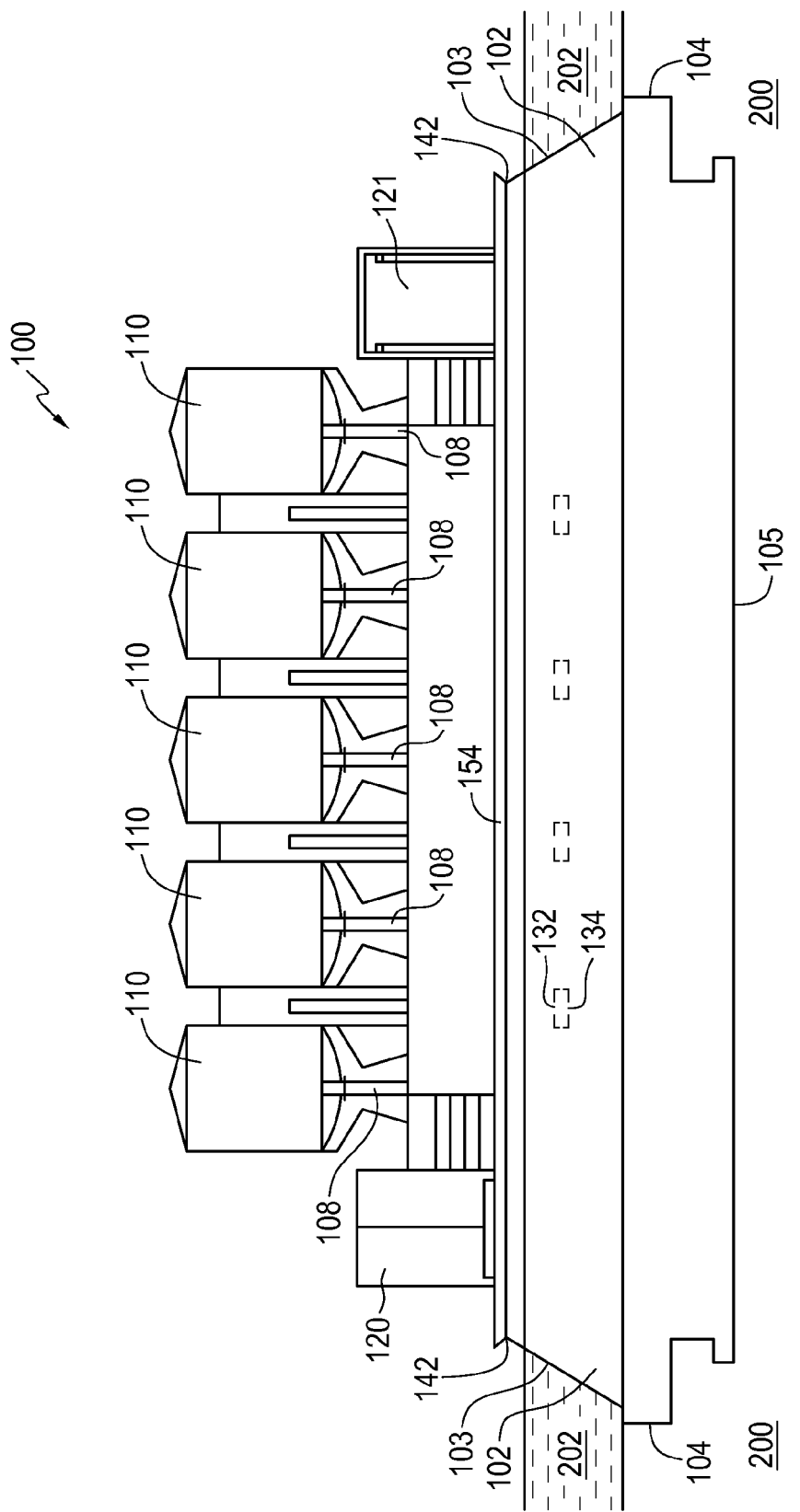
FIG. 2A illustrates an alternate cross-sectional elevation view of an exemplary hydro electric energy generation structure according to an embodiment of the invention, oriented perpendicular to the view illustrated in FIG. 1.

Referring now to FIGS. 2 and 2A, FIG. 2 illustrates a further elevation view of an exemplary hydro electric energy generation structure 100 according to an embodiment of the invention, oriented perpendicular to the view illustrated in FIG. 1. Similarly, FIG. 2A illustrates an alternate cross-sectional elevation view of an exemplary hydro electric energy generation structure according to an embodiment of the invention, oriented perpendicular to the view illustrated in FIG. 1A.

Similar to as shown in FIGS. 1 and 1A and described in detail above, the exemplary hydro electric energy generation structure 100 comprises gravity wall 102 forming an enclosed perimeter, the base 105 of which extends below the bottom 200 of existing reservoir 202 to enclose multiple lower water storage reservoirs 106. The exemplary structure 100 shown in FIGS. 1, 1A, 2 and 2A comprises 8 lower water storage reservoirs 106 in a configuration of two rows of 4 lower reservoirs 106 according to an exemplary embodiment. Further, as shown and described above, the exemplary structure 100 also comprises 15 upper water storage reservoirs 110 situated above the level of the top of gravity wall 102, and connected to the lower water storage reservoirs 106 by pump delivery conduits 108, according to an exemplary embodiment. In the same exemplary embodiment as shown in FIGS. 1, 1A, 2 and 2A, the exemplary structure 100 comprises 8 sets of upper and lower water inlets 134, 132, with four such sets located on each major side of the exemplary structure, and which admit water to four corresponding first penstocks (not shown in FIGS. 2 and 2A) which power four first turbine generators (not shown) as water flows from the first turbine generators into the corresponding lower water storage reservoirs 106.

Similar to as shown in FIGS. 1 and 1A and described above, the exemplary structure 100 shown in FIGS. 2 and 2A also comprises one or more water pumps (not shown) adapted to pump water from lower water storage reservoirs 106 up to upper water storage reservoirs 110 via pump delivery conduits 108. In the exemplary embodiment shown in FIG. 2, the pump delivery conduits 108 comprise structural as well as hydraulically conductive elements, and provide support to the upper water storage reservoirs 110 located at the top of the conduits 108. In the exemplary embodiment shown in FIG. 2A, additional structural elements are shown which provide further structural support to the upper water storage reservoirs 110, for example. As described above, exemplary structure 100 also comprises at least two second turbine generators 120, 121, which are located on opposite sides of the structure 100, for generation of electrical power from water supplied from upper water storage reservoirs 110 via second penstocks (not shown in FIGS. 2 and 2A), before such water exits from second tailraces 142, 144 and returns to existing reservoir 202.

Referring now to FIG. 3, a partial cross-sectional view of a portion of an exemplary hydro electric energy generation structure 300 according to an embodiment of the invention is shown. FIG. 3 shows a more finely detailed partial cross-sectional view of an exemplary hydro electric energy generation structure 300 that is essentially similar to the exemplary hydro electric energy generation structures 100 illustrated in FIGS. 1 and 1A, respectively. The hydro electric energy generation structure 300 comprises an outer perimeter gravity wall 302 comprising lower section 304 extending from a base 305 located below the bottom 200 of an existing reservoir 202, and inclined upper section 303 extending through the depth of existing reservoir 202 and above the waterline of reservoir 202. Within the interior of the gravity wall 302, at least one lower water storage reservoir 306 is located at the bottom of the structure 300, directly adjacent to base 305 of the structure 300.

The inclined upper section 303 of the gravity wall 302 includes at least one upper water inlet 332, located slightly below a high water level of the existing reservoir 202, and at least one lower water inlet 334, located slightly below a low water level of the existing reservoir 202 (such as corresponding to high and low tide levels of a marine reservoir, or seasonal high and low water levels of a non-marine reservoir, for example). Water from existing reservoir 202 enters through water inlets 332, 334, and passes through at least one first penstock 330 to power a first turbine generator 322 located below the low water level of the existing reservoir 202, and then through first tailrace 344 and into lower water storage reservoir 306 located below the first turbine generator 322 and first tailrace 344.

Similar to as described above with reference to FIGS. 1 and 1A, exemplary hydro electric energy generation structure 300 also comprises at least one water pump 324 operable to pump water from lower water storage reservoir 306 up to one or more upper water storage reservoirs 310 located above lower reservoir 306 and gravity wall 302. Such water may be pumped from lower reservoir 306 to upper reservoir 310 through pump delivery conduit 308, such as for storage of water in upper water storage reservoir 310 for future power generation. Structure 300 also comprises at least one second penstock 312 hydraulically connected to upper water storage reservoir 310 and adapted to conduct water from upper reservoir 310 to a second turbine generator 320 to power the second generator 320 for producing electrical power. Following second turbine generator 320, the water then flows through second tailrace 342 to return to the existing reservoir 202, according to one exemplary embodiment of the present invention.

Figure 4:
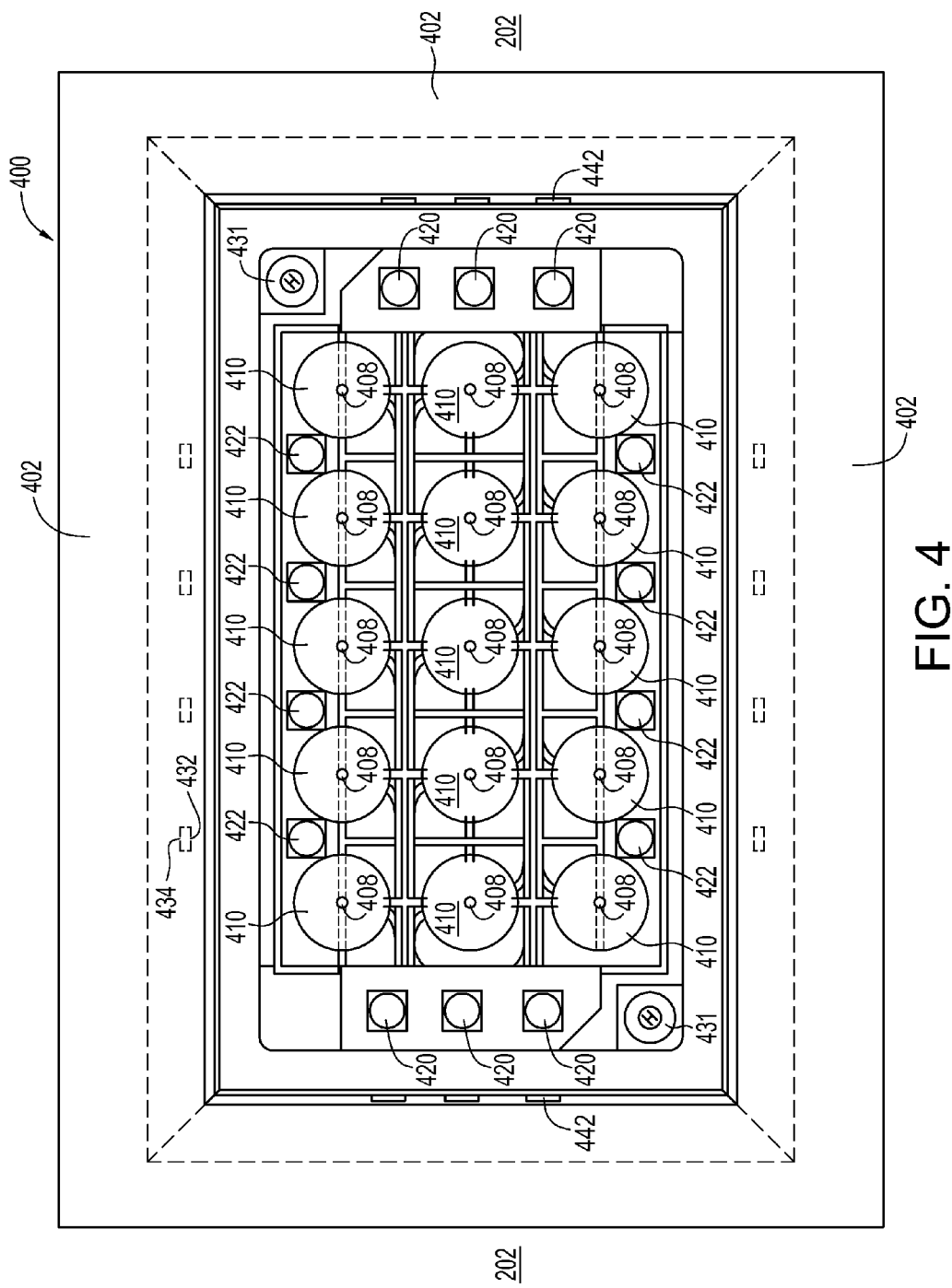
FIG. 4 illustrates a plan view of an exemplary hydro electric energy generation structure according to an embodiment of the invention.

Referring now to FIG. 4, a plan view of an exemplary hydro electric energy generation structure 400 is shown, according to an embodiment of the invention. The exemplary hydro electric energy generation structure 400 shown in plan view in FIG. 4 is essentially similar to the exemplary hydro electric energy generation structures 100 illustrated in FIGS. 1 and 1A, respectively. The exemplary hydro electric energy generation structure 400 is situated within an existing reservoir 202 such as an exemplary marine, or non-marine existing reservoir 202 for example, and structure 400 comprises a closed outer perimeter gravity wall 402, the upper section of which is shown inclined towards the interior of the structure 400 within the perimeter gravity wall 402. The top of the perimeter gravity wall 402 extends above the high water line of the existing reservoir 202, and the base (not shown) of the perimeter gravity wall 402 may preferably extend below the bottom of the existing reservoir 202. Within the interior of the gravity wall 402, multiple lower water storage reservoirs (not visible in FIG. 4) are located at the bottom of the structure 400, directly adjacent to the base (not shown) of the structure 400. In one particular embodiment, hydro electric energy generation structure 400 may comprise 8 lower water storage reservoirs of substantially equal size and divided substantially equally from the plan area of the base (not shown) of the structure 400, for example.

The inclined upper section of the perimeter gravity wall 402 includes multiple upper water inlets 432, located slightly below a high water level of the existing reservoir 202, and multiple corresponding lower water inlets 434, located slightly below a low water level of the existing reservoir 202 (such as corresponding to high and low tide levels of a marine reservoir 202, or seasonal high and low water levels of a non-marine reservoir 202, for example). Water from existing reservoir 202 enters through water inlets 432, 434, and passes through at least one first penstock (not shown) to power corresponding multiple first turbine generators 422 located below the low water level of the existing reservoir 202, and then through corresponding first tailraces (not shown) and into the lower water storage reservoirs (not shown) located below the first turbine generators 422 and first tailraces. In one particular embodiment, hydro electric energy generation structure 400 may comprise 8 first turbine generators 422 hydraulically connected to 8 corresponding water inlets 432, 434, so as to receive water from existing reservoir 202 to power the first turbine generators 422, following which such water exits first turbine generators 422 into 8 corresponding lower water storage reservoirs (not shown).

Similar to as described above with reference to FIGS. 1 and 1A, exemplary hydro electric energy generation structure 400 also comprises at least one water pump (not shown) operable to pump water from lower water storage reservoirs (not shown) up to multiple upper water storage reservoirs 410 which are located above the lower water storage reservoirs (not shown) and also above the perimeter gravity wall 402. Such water may be pumped from the lower water storage reservoirs (not shown) to upper water storage reservoirs 410 through pump delivery conduits 408, such as for storage of water in the upper water storage reservoirs 410 for future power generation. In one embodiment, hydro electric energy generation structure 400 also comprises multiple second penstocks (not shown) which are hydraulically connected to upper water storage reservoirs 410 and adapted to conduct water from upper water storage reservoirs 410 to multiple second turbine generators 420 to power the second turbine generators 420 in order to produce useful electrical power. Upon exiting the second turbine generators 420, the water from upper water storage reservoirs 410 may then flows through multiple second tailraces 442 to return to the existing reservoir 202, according to one exemplary embodiment. In a particular embodiment of the invention, hydro electric energy generation structure 400 may comprise 15 upper water storage reservoirs 410, each of which is supplied with water from at least one lower water storage reservoir (not shown) by a corresponding water pump (not shown) and a corresponding pump delivery conduit 408. In such particular embodiment, structure 400 may also comprise at least 15 second penstocks (not shown) for conducting water from the 15 upper water storage reservoirs 410 to at least 6 second turbine generators 420 for the generation of electrical power. In an exemplary such embodiment, second turbine generators 420 may be located near the periphery of the perimeter gravity wall 402 and may be secured to or otherwise structurally supported by the gravity wall 402. In one such embodiment, water passing through second turbine generators 420 may then be returned to existing reservoir 202 through 6 corresponding second tailraces 442, for example.

In an optional embodiment of the invention, hydro electric energy generation structure 400 may also comprise one or more utility platforms 431 which may be located one or substantially adjacent to the top of the perimeter gravity wall 402. In one such optional embodiment, one or more utility platforms 431 may structurally supported by or attached to the perimeter gravity wall 402, and may be adapted for logistical or transportation use related to the operation of the hydro electric energy generation structure 400, such as a helipad or heliport for facilitating transportation to and from the structure 400 by helicopter, for example. In another such optional embodiment, one or more utility platforms 431 may alternatively be used for support of one or more storage or habitation structures associated with the hydro electric energy generation structure 400, such as for storage or maintenance of equipment associated with the structure 400, or alternatively for housing of staff or residential residents co-located on the structure 400, such as may be particularly advantageous when the structure 400 is constructed nearby a town, city or other settlement area, for example.

In yet another optional embodiment, one or more utility platforms 431 may be used for installation of auxiliary and/or complementary power generation equipment or technology, such as but not limited to photovoltaic or wind power generation equipment and the supporting structures (such as supporting masts, arrays, towers etc.) associated with such optional power generation systems. In a particular such embodiment, such auxiliary and/or complementary power generation equipment may be used to augment electrical power generated by the turbine generators of the hydro electric energy generation structure 400, and/or to provide at least a portion of the power consumed by water pumps (not shown in FIG. 4) used to pump water into the upper water storage reservoirs 410, for example. In an alternative embodiment, other complementary technology and/or systems may be co-located on the hydro electric energy generation structure 400, such as water purification and/or desalination systems, for example, as may be desirable to provide purified water for consumption by personnel associated with the structure 400, or alternatively for supply into a water supply system at an onshore location proximate to the structure 400, for example. In one such embodiment, such complementary technology systems may be installed on one or more utility platforms 431, or alternatively may be installed in one or more enclosures located within hollow portions of gravity wall 402, or other spaces within the perimeter of the gravity wall 402, for example. In a particular such embodiment, water leaving second tailraces 442 may be used as a source of raw water for water purification and/or desalination technology co-located within the hydro electric energy generation structure 400, for example.

Figure 5:
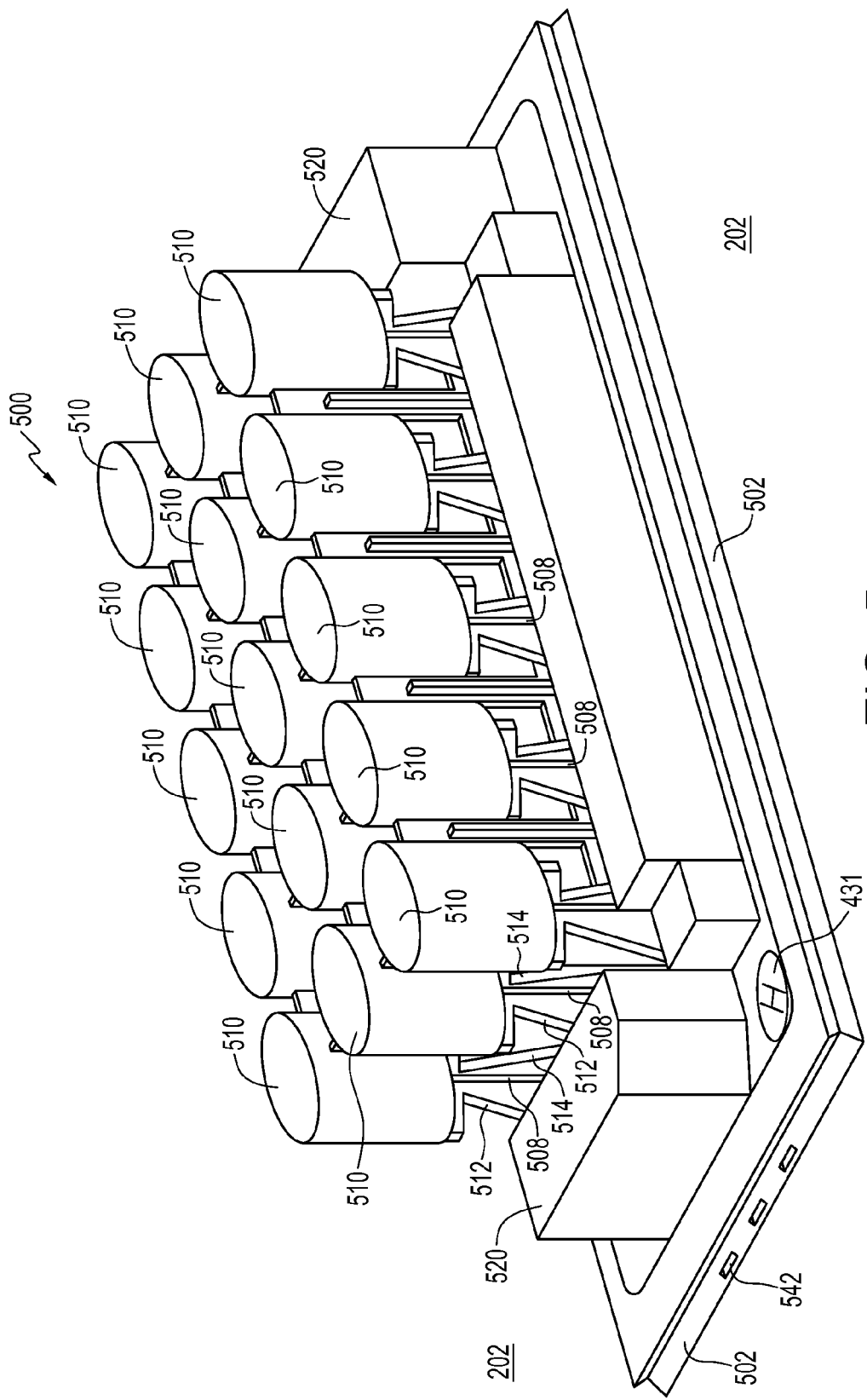
FIG. 5 illustrates a perspective view of an exemplary hydro electric energy generation structure according to an embodiment of the present invention.

Referring now to FIG. 5, a perspective view of an exemplary hydro electric energy generation structure 500 is shown, according to an embodiment of the present invention. The exemplary hydro electric energy generation structure 500 shown in perspective view in FIG. 5 is essentially similar to the exemplary hydro electric energy generation structures 100 and 400 illustrated in FIGS. 1, 1A, 2, and 2A, FIG. 4, and respectively. Similar to as shown and described above in reference to FIG. 4, the exemplary hydro electric energy generation structure 500 is situated within an existing reservoir 202 such as an exemplary marine, or non-marine existing reservoir 202 for example, and structure 500 comprises a closed outer perimeter gravity wall 502, the upper section of which extends above the high water line of the existing reservoir 202, and the base (not shown) of which may preferably extend below the bottom of the existing reservoir 202. Within the interior of the gravity wall 502, multiple lower water storage reservoirs (not visible in FIG. 5) are located at the bottom of the structure 500, directly adjacent to the base (not shown) of the structure 500. Further, multiple upper water inlets (not visible in FIG. 5) are located in the upper section of perimeter gravity wall 502 but slightly below the high water level of the existing reservoir 202, and are hydraulically connected to multiple first penstocks (not shown) to supply water from existing reservoir 202 to power multiple first turbine generators (not shown in FIG. 5) located below the water level of the existing reservoir 202, and thereafter to deliver the water into the lower water storage reservoirs (not shown) located below the first turbine generators via corresponding first tailraces (not shown).

Also, similar to as described above with reference to FIGS. 1 and 1A, and FIG. 4, exemplary hydro electric energy generation structure 500 also comprises at least one water pump (not shown) operable to pump water from lower water storage reservoirs (not shown) up to multiple upper water storage reservoirs 510 which are located above the lower water storage reservoirs (not shown) and also above the perimeter gravity wall 502, via corresponding pump delivery conduits 508, such as for storage of water in the upper water storage reservoirs 510 for future power generation. In one embodiment, hydro electric energy generation structure 500 also comprises multiple second penstocks 512, 514, which are hydraulically connected to upper water storage reservoirs 510 and adapted to conduct water from upper water storage reservoirs 510 to multiple second turbine generators 520 to power the second turbine generators 520 in order to produce useful electrical power. It may be noted that in the exemplary embodiment of the structure 500 shown in FIG. 5, multiple second turbine generators 520 are enclosed within a second turbine enclosure and are not individually visible as in the cross-sectional plan view of FIG. 4. Upon exiting the second turbine generators 520, the water from upper water storage reservoirs 510 may then flow through multiple second tailraces 542 to return to the existing reservoir 202, according to one exemplary embodiment.

Also similar to as shown and described above in reference to FIG. 4, in a particular embodiment of the invention, hydro electric energy generation structure 500 may comprise 15 upper water storage reservoirs 510, each of which is supplied with water from at least one lower water storage reservoir (not shown) by a corresponding water pump (not shown) and a corresponding pump delivery conduit 508. In such particular embodiment, structure 500 may also comprise at least 15 corresponding second penstocks 512, 514 for conducting water from the 15 upper water storage reservoirs 510 to at least 6 second turbine generators 520 for the generation of electrical power. In an exemplary such embodiment, second turbine generators 520 may be located near the periphery of the perimeter gravity wall 502 and may be secured to or otherwise structurally supported by the gravity wall 502. In one such embodiment, water passing through second turbine generators 520 may then be returned to existing reservoir 202 through 6 corresponding second tailraces 542, which may be located in two equal groups at either of two opposite ends of the perimeter gravity wall 502, for example.

According to one embodiment of the invention, the perimeter gravity wall 500 of the hydro electric energy generation system 500 may be constructed within an existing reservoir 202 according to any suitable know methods for construction of large structures in underwater or submerged environments. In a particular such embodiment, the construction and use of a cofferdam or other water retaining structure may be used to exclude water from the existing reservoir 202 from the area upon which construction of the structure 500 is to take place. In such an embodiment, following construction and/or emplacement of the perimeter gravity wall 502, the cofferdam or other water retaining structure may be removed from the existing reservoir 202 to allow water from the reservoir 202 to surround the structure 500 as may be required for power generation operation of the structure 500.

In an alternative embodiment, an exemplary hydro electric energy generation structure 100 may be constructed on dry land and only nearby or adjacent to an existing hydraulic reservoir, for example. In one such embodiment, water from an existing hydraulic source, such as an ocean, river or lake, may be used to provide a water source for one or more water inlets into the hydro electric energy generation structure 100, such as exemplary water inlets 132, 134, for example. In a further alternative embodiment, a hydro electric energy generation structure 100 may be constructed on dry land at some distance from an existing hydraulic reservoir, and water from an existing hydraulic source, such as an ocean, river or lake, may be diverted and delivered, such as by water conduit (pipeline, canal, channel, etc.) and used to provide a water source for one or more water inlets into the hydro electric energy generation structure 100.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings. Further advantages and applications of the illustrative embodiments described above may be realized by a skilled practitioner.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A hydro electric energy generation structure adapted for installation in a hydraulic reservoir, the structure comprising:
    a gravity wall forming an outer perimeter of said structure, wherein said gravity wall comprises a first section inclined towards the center of said structure and adapted to bear on a floor of said hydraulic reservoir and extend above an upper water level of said hydraulic reservoir, and a second section adapted for installation extending below the floor of said hydraulic reservoir;
    at least one water inlet situated in said first section of said gravity wall hydraulically connected to a first penstock for delivering water from said reservoir to a first turbine generator situated below said water inlet and thereafter to a first tailrace;
    at least one lower water storage reservoir situated below said first tailrace and within said perimeter of said gravity wall, for receiving water from said first turbine generator;
    at least one pump hydraulically connected to said lower water storage reservoir for receiving water from said lower water storage reservoir;
    at least one pump delivery conduit hydraulically connected to said pump;
    at least one upper water storage reservoir situated and supported above said gravity wall and hydraulically connected to said pump delivery conduit for receiving water from said pump;
    at least one second penstock hydraulically connected to said upper water storage reservoir for delivering water from said upper water storage reservoir to a second turbine generator situated below said upper water storage reservoir and above said water inlet.

2. The hydro electric energy generation structure according to claim 1, additionally comprising a second tailrace for receiving water from said second turbine generator and delivering said water into said hydraulic reservoir.

3. The hydro electric energy generation structure according to claim 1, wherein said hydraulic reservoir comprises an existing natural hydraulic reservoir.

4. The hydro electric energy generation structure according to claim 3, wherein said existing natural hydraulic reservoir comprises at least one of a marine, lake, river, or estuarine natural hydraulic reservoir.

5. The hydro electric energy generation structure according to claim 1, additionally comprising a support structure, wherein said support structure is structurally secured to said gravity wall and adapted to support said at least one upper water storage reservoir.

6. The hydro electric energy generation structure according to claim 1, wherein said at least one water inlet comprises an upper and a lower water inlet, said upper water inlet situated below an upper water level of said hydraulic reservoir, and said lower water inlet situated below a lower water level of said hydraulic reservoir.

7. The hydro electric energy generation structure according to claim 1, wherein said first and second turbine generators each comprise at least one of a Francis turbine and a Pelton turbine.

8. The hydro electric energy generation structure according to claim 1, wherein at least one of said first and second turbine generators are electrically connected to supply electrical energy to an electrical supply grid.

9. The hydro electric energy generation structure according to claim 1, wherein said pump is electrically connected to at least one of said first and second turbine generators and an electrical supply grid, to receive electrical energy to operate said pump.

10. The hydro electric energy generation structure according to claim 1, wherein said at least one water inlet comprises at least one inlet valve.

11. The hydro electric energy generation structure according to claim 1, wherein said gravity wall comprises at least one of a solid concrete gravity wall and a hollow concrete gravity wall.

12. The hydro electric energy generation structure according to claim 5, wherein said at least one pump delivery conduit and said at least one second penstock are structurally secured to said support structure.

13. The hydro electric energy generation structure according to claim 1, wherein said first and second turbine generators are structurally secured to said gravity wall.

14. The hydro electric energy generation structure according to claim 11, wherein said concrete gravity wall comprises a reinforced concrete gravity wall.

15. The hydro electric energy generation structure according to claim 1 wherein said first section of said gravity wall is inclined towards the center of said structure at an angle between 27 degrees and 88 degrees from the horizontal.

16. The hydro electric energy generation structure according to claim 5, additionally comprising at least one habitable residential structure attached to said support structure.

17. A method of generating electrical power using the hydro electric energy generation structure of claim 1, the method comprising:
  generating electrical power by admitting water into said at least one water inlet to drive said at least one first turbine generator during a first period of higher power demand from an electrical supply grid electrically connected to said at least one first turbine generator;
  operating said at least one water pump to pump water from said at least one lower water storage reservoir to said at least one upper water storage reservoir during a second period of lower power demand from an electrical supply grid electrically connected to supply power to said at least one water pump; and
  generating electrical power by admitting water from said at least one upper water storage reservoir to power said at least one second turbine generator during a third period of higher power demand from an electrical supply grid electrically connected to said at least one second turbine generator.

18. The method of generating electrical power according to claim 11, wherein said electrical supply grid is connected to at least one conventional base load power generation source.

19. The method of generating electrical power according to claim 11, wherein said electrical supply grid is connected to at least one variable capacity renewable power generation source.

* * * * *